(12) United States Patent
Simon

(10) Patent No.: US 7,895,995 B2
(45) Date of Patent: Mar. 1, 2011

(54) LAUNCHER AND CHASE TOY COMBINATION AND METHOD

(76) Inventor: David F. Simon, Lakeland, FL (US)

( * ) Notice: Subject to any disclaimer, the term of this patent is extended or adjusted under 35 U.S.C. 154(b) by 486 days.

(21) Appl. No.: 12/069,902

(22) Filed: Feb. 12, 2008

(65) Prior Publication Data
US 2009/0120419 A1 May 14, 2009

Related U.S. Application Data

(60) Provisional application No. 61/002,472, filed on Nov. 10, 2007.

(51) Int. Cl.
*F41B 3/00* (2006.01)

(52) U.S. Cl. .......... 124/5; 124/4; 124/6; 124/7; 119/702; 119/707; 446/46; 446/48; 473/460

(58) Field of Classification Search ................ 124/4–7; 119/702, 707; 473/460; 446/46, 48
See application file for complete search history.

(56) References Cited

U.S. PATENT DOCUMENTS

| | | | | | |
|---|---|---|---|---|---|
| 1,530,573 | A | * | 3/1925 | Olcott | 473/513 |
| 1,535,029 | A | * | 4/1925 | Murch | 124/5 |
| 1,607,874 | A | * | 11/1926 | Darton | 124/5 |
| 2,493,245 | A | * | 1/1950 | Hansen | 124/5 |
| 2,802,299 | A | * | 8/1957 | Lohr | 446/40 |
| 2,953,378 | A | * | 9/1960 | La Veigne, Jr. | 473/514 |
| 3,095,867 | A | * | 7/1963 | Kiynna | 124/5 |
| 3,428,036 | A | * | 2/1969 | Parker | 124/5 |
| 3,575,414 | A | * | 4/1971 | O'Brien | 473/514 |
| 3,589,349 | A | * | 6/1971 | Parker | 124/5 |
| 3,698,123 | A | * | 10/1972 | Heldt | 446/120 |
| 3,959,917 | A | * | 6/1976 | Dawson | 446/37 |
| 4,076,004 | A | * | 2/1978 | Huelskamp | 124/5 |
| 4,104,822 | A | * | 8/1978 | Rodgers | 446/48 |
| 4,233,952 | A | * | 11/1980 | Perkins | 124/5 |
| 4,253,269 | A | * | 3/1981 | Sullivan | 446/46 |
| 4,267,799 | A | * | 5/1981 | Bacon | 119/61.2 |
| 4,549,521 | A | * | 10/1985 | Hargrave, Jr. | 124/5 |
| 4,872,688 | A | * | 10/1989 | Galvin | 473/509 |
| 4,955,842 | A | * | 9/1990 | Marcotti | 446/46 |
| 4,984,556 | A | * | 1/1991 | Glass et al. | 124/5 |
| 4,995,374 | A | * | 2/1991 | Black | 124/54 |
| 5,078,637 | A | * | 1/1992 | McFarland | 446/46 |
| 5,088,469 | A | * | 2/1992 | Hargrave | 124/5 |
| 5,181,500 | A | * | 1/1993 | Chamberland | 124/5 |
| 5,232,226 | A | * | 8/1993 | Glickson | 473/510 |
| 5,235,727 | A | * | 8/1993 | McCloskey | 24/3.3 |
| 5,282,634 | A | * | 2/1994 | Chamberland | 473/510 |
| 5,366,403 | A | * | 11/1994 | Weiss | 446/46 |
| 5,390,652 | A | * | 2/1995 | Minneman et al. | 124/5 |
| 5,465,704 | A | * | 11/1995 | Kohl | 124/5 |
| 5,515,835 | A | * | 5/1996 | Minneman et al. | 124/5 |
| 5,537,985 | A | * | 7/1996 | Kohl | 124/5 |
| 5,579,748 | A | * | 12/1996 | Kohl | 124/5 |

(Continued)

*Primary Examiner* — Gene Kim
*Assistant Examiner* — Alexander R Niconovich
(74) *Attorney, Agent, or Firm* — John R. Benefiel

(57) ABSTRACT

The combination of a toy and launcher member for use in providing chase activities for pets, the toy being toroidally shaped and propelled by a whipping stroke of an elongated launch member having a gripper at one end which is engaged with a segment of the perimeter of the toy. A whipping stroke of the launcher causes release of the toy from the gripper which propels the toy away at high speed, with a top spin imparted thereto which causes the toy to roll and bounce for a great distances along the ground.

4 Claims, 2 Drawing Sheets

U.S. PATENT DOCUMENTS

| | | | |
|---|---|---|---|
| 6,076,829 A * | 6/2000 | Oblack | 273/317 |
| 6,193,620 B1 * | 2/2001 | Tarng | 473/465 |
| 6,347,973 B1 * | 2/2002 | Grant et al. | 446/450 |
| 6,477,745 B2 * | 11/2002 | Strebl | 24/3.12 |
| 6,918,809 B2 * | 7/2005 | Persall | 446/46 |
| 7,520,818 B2 * | 4/2009 | Winchester | 473/282 |
| 7,665,453 B1 * | 2/2010 | D'Agostino | 124/5 |
| 7,665,454 B1 * | 2/2010 | D'Agostino | 124/5 |
| 7,677,994 B2 * | 3/2010 | Matsumoto et al. | 473/510 |
| 7,686,001 B2 * | 3/2010 | Fitt | 124/5 |
| 2002/0078533 A1 * | 6/2002 | Strebl | 24/3.12 |
| 2005/0034681 A1 * | 2/2005 | Block | 119/707 |
| 2005/0061258 A1 * | 3/2005 | Block | 119/707 |
| 2005/0092258 A1 * | 5/2005 | Markham | 119/707 |
| 2006/0032459 A1 * | 2/2006 | Jager | 119/707 |
| 2006/0073758 A1 * | 4/2006 | Goodwin et al. | 446/48 |
| 2007/0022972 A1 * | 2/2007 | Morrison | 119/707 |
| 2008/0072885 A1 * | 3/2008 | Fitt | 124/5 |
| 2008/0072886 A1 * | 3/2008 | Cattlin | 124/5 |
| 2008/0127955 A1 * | 6/2008 | Christ | 124/5 |

* cited by examiner

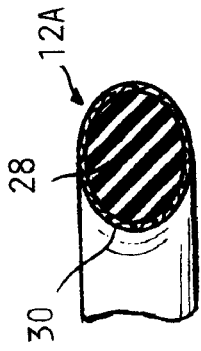
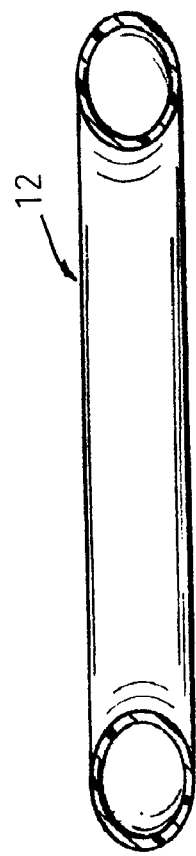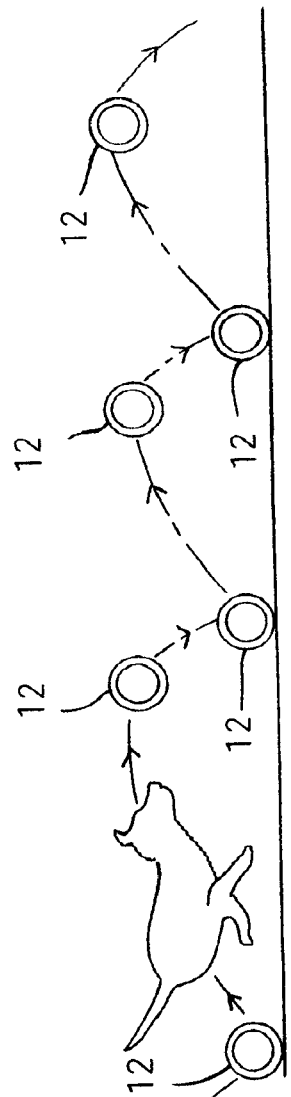
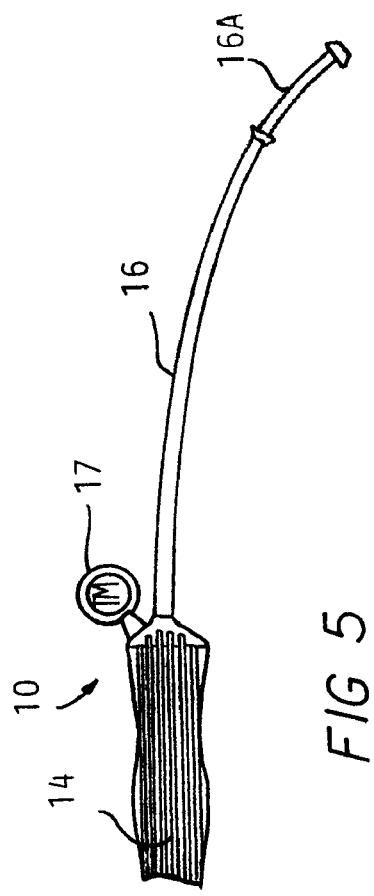
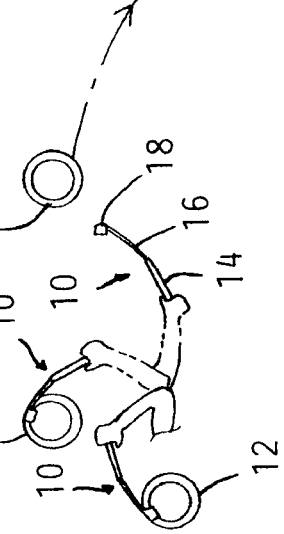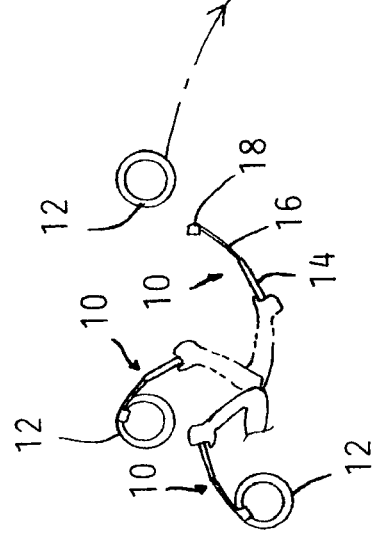
FIG 6A
FIG 6
FIG 5
FIG. 7

LAUNCHER AND CHASE TOY COMBINATION AND METHOD

CROSS REFERENCE TO RELATED APPLICATION

This application claims the benefit of U.S. provisional application No. 60/002,472 filed on Nov. 11, 2007.

BACKGROUND OF THE INVENTION

This invention concerns pet toys and more particularly a chase toy for dogs in which an object is able to be thrown so that a dog may run down and fetch the toy.

Many dogs have an abundance of energy and merely throwing a ball or stick for a short distance does not provide sufficient challenge or exercise and may be tedious and tiresome for the pet owner. There has been heretofore devised a launcher for a ball which increases the distance a ball can be thrown for this purpose, as described in U.S. Pat. No. 6,477,745.

While an advance over simply throwing a ball, the rolling of the ball is retarded by backspin inherently imparted to the ball by the launcher. Also, the rolling movement is predictable as to not provide great interest in the "chase".

Disc launchers are also shown in U.S. Pat. Nos. 2,953,378; 2,493,245; and 3,095,867, but these flat discs are not suitable for dog toys of this nature as they are not easily gripped in a dog's mouth. The launchers are also not convenient to use for this purpose involving a somewhat tricky loading and release of the flat discs.

It is an object of the present invention to provide a launcher and chase toy which increases the challenge and interest of both the pet and its owner, is well suited to retrieval by a dog, and is simple to use.

SUMMARY OF THE INVENTION

The above object and other objects which will become apparent upon a reading of the following specification and claims are achieved by an elongated launcher member having a gripper at one end able to releasably grasp a segment of the perimeter of a toroidal toy. The launcher member may comprise an elongated flexible blade having a handle at the other end. The toroidal gripper is preferably comprised of a pair of dished wings defining therebetween space which is complementary to the cross-sectional round shape of the toy perimeter. The wings are able to be elastically spread apart to at least partially encircle the rounded cross-section gripped segment of the perimeter to securely grasp the perimeter of the toy.

An angled out entry feature on each dished wing forms a wedging entryway into the defined space between the wings. This allows the gripper to conveniently be brought into engagement with the toroidal toy by rolling motions of the launcher after contacting the entry feature with the perimeter of the toy, forcing the segment of the toroidal toy into the space between the gripper wings to be at least partially encircled and held thereby. The dished shape of the wings are generally complementary to the rounded shape of the ovoidal cross sectional shape of the toroidal toy to be fit thereto when gripping the perimeter of the toy. This at least partial encirclement reliably prevents release of the toy from the gripper until a predetermined centrifugal force is developed of a magnitude able to spread the gripper wings sufficiently to allow the toy to pass out between the spread apart wings.

These forces are generated upon executing a whipping stroke of the launcher member, the gripper wings designed to spread apart and release the toy from the gripper at high speed at an advanced point in the whipping motion, with a strong top spin imparted thereto because of the location of gripping of the toy at its perimeter, which trails the rest of the toy at the point of release to impart top spin resulting in a pronounced tendency for the toy to execute a forward rolling motion when the toy hits the ground. This also often results in an erratic bouncing path followed by the toy over a great distance, creating a very attractive chase object for a dog. The ability to project the toy for great distances is also a source of amusement to the user.

The rounded in section toroidal shape is easily grasped by the dog in its mouth when retrieving the top and coming back to the person launching the toy.

DESCRIPTION OF THE DRAWINGS

FIG. 5 is a side view of the launcher member without the gripper.

FIG. 6 is an enlarged sectional view of the toroidal toy shown in FIG. 1.

FIG. 6A is an enlarged sectional view of an alternative configuration of the cross-section of a segment of the toy.

FIG. 7 is a diagrammatic depiction of the launching of the toy and a typical path taken along the ground.

DETAILED DESCRIPTION

Figure 1:
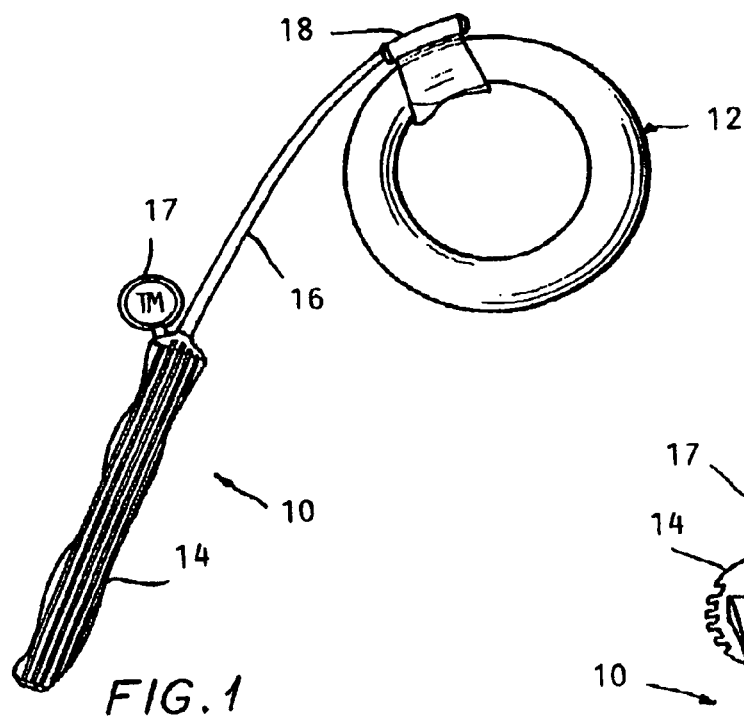
FIG. 1 is a side view of a launcher member and a toroidal toy according to one embodiment of the invention, the toy held in a gripper on one end of the launcher opposite a handle end.
Figure 2:
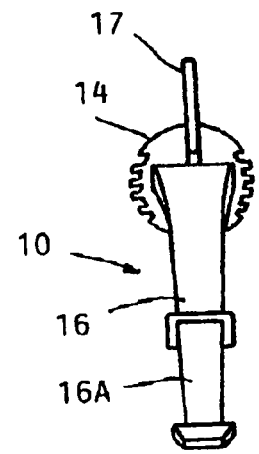
FIG. 2 is an endwise view of the launcher member shown in FIG. 1.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims. Referring to the drawings and particularly FIGS. 1 and 2 one embodiment of the present invention includes an elongated launcher member 10 and a generally toroidally shaped toy 12.

The launcher member 10 has a handle 14 at one end from which extends an elongated, tapered, and curved flexible blade portion 16. A projecting disc feature 17 may be provided at one end of the handle 14 for imprinting a trademark logo. The rectangular in section tapered blade shape of the flexible portion 16 is wider than its thickness and this creates a greater lateral stiffness concentrating its flexing and whipping motion in a direction aligned with the motion of the handle 14. However, other configurations of the launcher member 10 can be used such as a straight round rod, as long as it is sufficiently elongated to produce a high velocity by the whipping motion thereof.

The launcher member may also be telescoped to be more compact for shipping, packaging and storage in the manner well known for such objects as fishing rods, etc.

A gripper 18 is attached at the free end 16A of the blade portion 16 as by being received in a rectangular opening 20 formed in the gripper body. The gripper 18 may be attached in other ways or molded integrally with the launcher member 10.

The launcher member 10 may be made of a suitable plastic as by molding, the particular type of plastic selected such that the blade portion 16 is resiliently deflectable to be flexed when launching the toy 12 generating a stronger whipping action when the motion is arrested at the end of the stroke.

Figure 3:
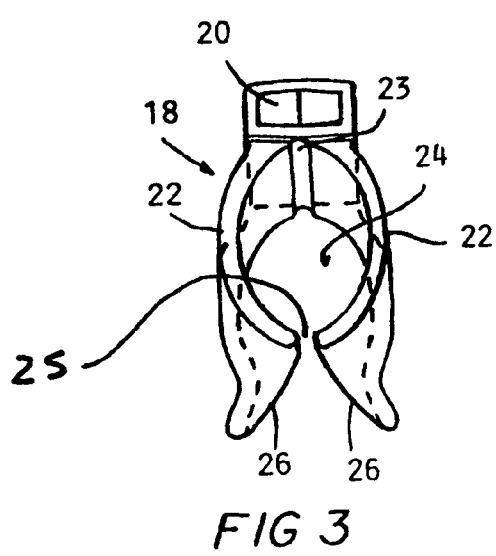
FIG. 3 is an enlarged endwise view of the gripper on one end of the launcher member shown in FIG. 1.
Figure 4:
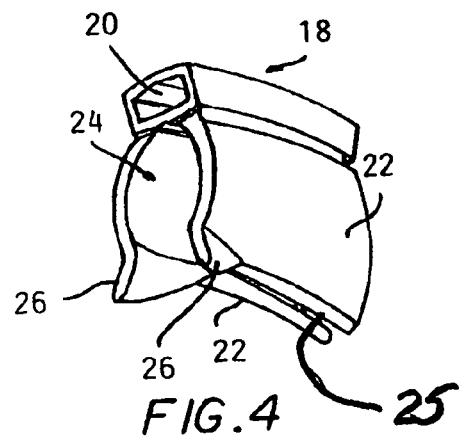
FIG. 4 is a pictorial enlarged view of the gripper shown in FIG. 3.

The gripper 18 may be molded of a suitably flexible material and includes a pair of dished wings 22 connected together along one side to a gripper body portion 25 and collectively forming an ovoidal space 24 defined between the wings 22 (FIGS. 3 and 4).

The wings 22 are integral with the body 25 along one side with an optional groove which could be added if needed to allow easier elastic flexing apart of the wings 22 to allow spreading apart of their free sides against the elastic resistance provided by their connection together enabling entry of a segment of the toroidal toy 12 into the curved space 24 defined therebetween.

A slot 25 between the wings 22, allows separation of the wings as the toy 12 rolls along the slot 25 in ultimately being released.

A convergent entry feature comprised of an outwardly angled corners 26 of each wing 22 at one end facilitates wedging apart of the wings 22 to enable loading of a segment of the perimeter the toy 12 into the space 24 in the gripper 18, as will be described in further detail below. The toy segment is encircled either partially or entirely by the curved wings 22 within space 24. This creates a secure grip which only releases when the whipping motion is completed, the toy 12 progressively moving out along the slot 25 the wings being forced apart to accomodate the gripped segment of the toy to be released at the end of the throwing motion.

The toy 12 cross section may be hollow (FIG. 6) to be compressible and lightweight yet stiff enough to be able to bounce and roll without rapid loss of its momentum when hitting the ground, and is preferably made of an elastomeric material commonly used for dog chew toys to withstand a dog's chewing over extended periods of use. It also may be flattened slightly to have an ovoidal cross sectional shape to improve its aerodynamics by reducing its drag during flight and its rounded shape is at least generally matched to the inside curvature of the space 24 defined between dished wings 22.

The ovodial cross sectional shape of the toy is flattened to be narrower along an axis passing through the slot 25 than along an axis in the direction of the slot to also assist in spreading the wings 22 apart by the toy 12.

FIG. 6A shows an alternative construction of the toy 12A in which a foam rubber or plastic core 28 is covered with a tough fabric covering 30 such as ballistic nylon sewn on to the core 28.

It is important that the stiffness of the gripper 18 and compressibility of the toy 12 be selected so that when the launch member 10 is whipped overhand the toy 12 will be held until maximum velocity is reached at an advanced point in the whipping motion of the launcher 10. When the centrifugal forces reach a predetermined sufficiently high level, the toy 12 will be released from the launcher 10 when its motion is arrested at the end of the stroke by the spreading apart of the wings 22 against the elastic forces generated by being connected together along one side to a sufficient extent induced by the centrifugal forces developed, and the toy propelled away at a high velocity with a pronounced top spin.

The gripping of a segment of the toy 12 at a point on its perimeter imparts a considerable top spin of the toy 12 when projected from the launcher member 10 since at release the point of connection trails the rest of the toy which thus is rotated about the point of connection in being released. This top spin contributes to its bouncing, erratic motion and the relatively long distance traveled along the ground as depicted in FIG. 7.

In contrast, a ball launched from a pocket tends to have backspin imparted thereto as it rolls off the pocket.

Since the toy 12 will travel at high speed and bounce and turn erratically, this will strongly appeal to a dog's chase instincts. The great distance traveled will be enough to challenge the most energetic pet and provide amusement and interest for both the pet and owner.

To load the launcher member 18, the toy 12 is stood on edge by inserting the toe of the user's shoe or boot into the center space of the toy 12 and rolling it sideways bringing it to an on edge portion. Once on edge, the gripper 18 is aligned with a top segment of the toy 12 with the entry features 26 against the segment, and, the launcher member 10 then pulled toward the user so as to create a wedging apart of the wings 22 to allow the perimeter of the toy 12 to enter the space 24 to have a segment thereof gripped as the wings 22 move back onto its flattened toroidal shape at least partially encircling the same to create a secure grasping of the toy 12 sufficient to delay release until a high velocity is imparted to the toy 12 by the whipping motion of the launcher 10.

As noted above, the dished concave shape of the inside of the wings 22 is at least generally matched to the rounded cross sectional shape of the gripped segment of the toy 12 to allow the toy 12 to be securely retained therebetween as seen in FIG. 1, and thereby held in readiness for a launch.

The invention claimed is:

1. In combination, a launcher member and a toy to be launched therefrom, said launcher comprising a member having a grippable handle from which extends an elongated portion;

a toroidal toy;

a gripper on a free end of said elongated portion of said launcher member, said gripper including opposed deflectable portions configured to grip a segment of said toroidal toy when spread apart, whereby said toy may be launched with a vigorous whipping motion of said launcher member sufficiently rapid to spread apart said portions and release said toy from said gripper whereby said toy is propelled away from said launcher member and a top spin induced thereby;

said gripper comprising a pair of elastically spreadable wings receiving a segment of a perimeter of said toroidal toy in a space therebetween through a slot defined between a free side of said wings;

said wings being dished to define a curved space therebetween generally conformed to a rounded cross sectional shape of said toroidal toy which partially encircles said cross section of said gripped segment of said perimeter of said toy; and said wings each having an outwardly flared portion on an end of said slot adjacent said handle to cause a wedging action aiding in spreading said wings apart when a segment of said toroidal toy is pushed against said flared portions to spread said wings apart and allow said segment to enter said space and thereafter grip and partially encircle said toroidal toy segment or to exit said space at the end of a throwing motion by a motion of said toy causing said toy to act on said flared portion to initiate spreading of said wings and to move along said slot by spreading of the wings until released by movement out of the end of the slot.

2. The combination according to claim 1 wherein said toy has a flattened ovoidal cross sectional shape to reduce aerodynamic drag in flight and said space defined between wings has an at least generally matching shape to said toy cross sectional shape said toy cross sectional shape narrower along an axis extending through said slot than along an axis in the direction of said slot to thereby assist in forcing said wings apart as said toy segment moves along said slot to be launched.

3. The combination according to claim 1 wherein said launcher has elongated portion is flexible and comprises a blade having a rectangular in section shape wider than deep to be relatively stiff in sideways directions.

4. The combination according to claim 2 wherein said toroidal toy segment is hollow in cross section.

* * * * *

UNITED STATES PATENT AND TRADEMARK OFFICE
CERTIFICATE OF CORRECTION

| | | |
|---|---|---|
| PATENT NO. | : 7,895,995 B2 | Page 1 of 1 |
| APPLICATION NO. | : 12/069902 | |
| DATED | : March 1, 2011 | |
| INVENTOR(S) | : David F. Simon | |

It is certified that error appears in the above-identified patent and that said Letters Patent is hereby corrected as shown below:

Col. 6, line 4, delete "has".

Signed and Sealed this

Nineteenth Day of April, 2011

David J. Kappos
*Director of the United States Patent and Trademark Office*